US009143682B2

(12) United States Patent  
Ishige

(10) Patent No.: US 9,143,682 B2  
(45) Date of Patent: Sep. 22, 2015

(54) IMAGE CAPTURING APPARATUS, METHOD, AND RECORDING MEDIUM CAPABLE OF CONTINUOUSLY CAPTURING OBJECT

(75) Inventor: Yoshiki Ishige, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 992 days.

(21) Appl. No.: 13/289,145

(22) Filed: Nov. 4, 2011

(65) Prior Publication Data

US 2012/0113267 A1   May 10, 2012

(30) Foreign Application Priority Data

Nov. 10, 2010   (JP) ................................. 2010-251646  
Aug. 30, 2011   (JP) ................................. 2011-187972

(51) Int. Cl.
 *H04N 5/00*   (2011.01)  
 *H04N 5/232*   (2006.01)  
 *H04N 5/14*   (2006.01)

(52) U.S. Cl.
 CPC ........... *H04N 5/23232* (2013.01); *H04N 5/145* (2013.01); *H04N 5/23293* (2013.01)

(58) Field of Classification Search
 CPC .. H04N 5/225; H04N 5/23232; H04N 7/0127  
 USPC ........................................................ 348/169  
 See application file for complete search history.

(56) References Cited

U.S. PATENT DOCUMENTS

| 8,384,785 B2 * | 2/2013 | Solomon .................... 348/207.1 |
| 2007/0038958 A1 * | 2/2007 | Gohda ......................... 715/823 |

| 2008/0001938 A1 | 1/2008 | Sakai | |
| 2010/0296798 A1 * | 11/2010 | Koyama ........................ 386/343 |
| 2013/0088601 A1 * | 4/2013 | Connell, II .................... 348/159 |

FOREIGN PATENT DOCUMENTS

| JP | 2007208850 A | 8/2007 |
| JP | 2007336353 A | 12/2007 |
| JP | 2008092174 A | 4/2008 |
| JP | 2010068291 A | 3/2010 |
| JP | 2010-166304 A | 7/2010 |

OTHER PUBLICATIONS

Japanese Office Action dated Nov. 25, 2014, issued in counterpart Japanese Application No. 2011-187972.

* cited by examiner

*Primary Examiner* — Sath V Perungavoor  
*Assistant Examiner* — Jeffery Williams  
(74) *Attorney, Agent, or Firm* — Holtz, Holtz, Goodman & Chick PC

(57) ABSTRACT

An image capturing apparatus includes an image capturing unit, a designating unit configured to designate a main-area or a position to which a moving object is to reach, in each captured image captured by the image capturing unit, an image capturing control unit configured to control the image capturing unit to continuously capture the moving object at a predetermined frame rate, a position specifying unit configured to specify a position of the moving object in the image captured by the image capturing unit, and a frame rate control unit configured to control the predetermined frame rate, based on the specified position of the moving object, and either the main-area or position.

15 Claims, 6 Drawing Sheets

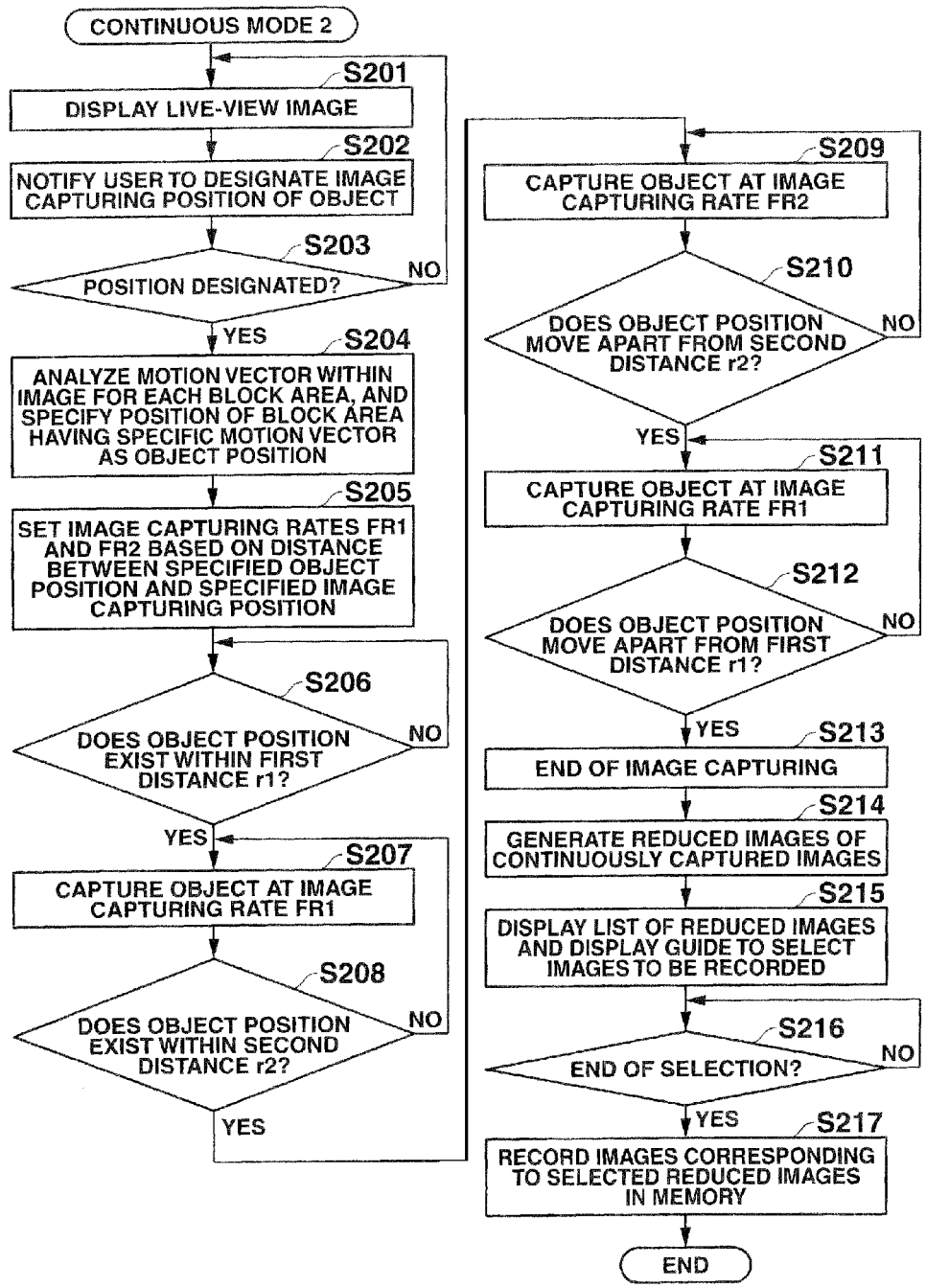

IMAGE CAPTURING APPARATUS, METHOD, AND RECORDING MEDIUM CAPABLE OF CONTINUOUSLY CAPTURING OBJECT

CROSS-REFERENCE TO RELATED APPLICATIONS

This application is based upon and claims the benefit of priority from prior Japanese Patent Applications No. 2010-251646, filed Nov. 10, 2010; and No. 2011-187972, filed Aug. 30, 2011, the entire contents of all of which are incorporated herein by reference.

BACKGROUND OF THE INVENTION

1. Field of the Invention

The present invention relates to an image capturing apparatus which captures, for example, a moving object, an image capturing control method, and a recording medium.

2. Description of the Related Art

As a conventional technique, Jpn. Pat. Appln. KOKAI Publication No. 2010-166304 discloses a technique of setting a main image capturing area to capture a moving object within the image capturing area in order to improve the quality of an image acquired by panning. In this patent literature, while the main image capturing area is exposed by a plurality of number of times, the background area other than the main image capturing area is exposed once, and a composited image is generated, acquiring an image in which the moving object stands still while the background is moving.

BRIEF SUMMARY OF THE INVENTION

Accordingly, it is an object of the present invention to provide an image capturing apparatus, an image capturing control method, and a recording medium, capable of easily capturing a plurality of images of a moving object in a composition the user wants.

According to one aspect of the present invention, there is provided an image capturing apparatus comprising: an image capturing unit; a designating unit configured to designate a main-area or a position to which a moving object is to reach, in each captured image captured by the image capturing unit; an image capturing control unit configured to control the image capturing unit to continuously capture the moving object at a predetermined frame rate; a position specifying unit configured to specify a position of the moving object in the image captured by the image capturing unit; and a frame rate control unit configured to control the predetermined frame rate, based on the specified position of the moving object, and either the main-area or position.

According to one aspect of the present invention, there is provided an image capturing apparatus comprising: an image capturing unit; a detection unit configured to detect a position of a moving object in an image capturing area of the image capturing unit; a speed obtaining unit configured to obtain information indicative of a moving speed of the moving object; a first setting unit configured to set an area, which has a size based on the information indicative of the moving speed of the moving object obtained by the speed obtaining unit, in the image capturing area of the image capturing unit; a determination unit configured to determine a relationship between the position of the moving object detected by the detection unit in the image capturing area of the image capturing unit and a position of the area set by the first setting unit; and a control unit configured to control a frame rate, which is used to record an image to be captured by the image capturing unit, based on a result of the determination by the determination unit.

According to another aspect of the present invention, there is provided an image capturing control method for use in an apparatus including an image capturing unit, the method comprising: detecting a position of a moving object in an image capturing area of the image capturing unit; obtaining information indicative of a moving speed of the moving object; setting a first area, which has a size based on the obtained information indicative of the moving speed of the moving object, in the image capturing area of the image capturing unit; determining a relationship between the detected position of the moving object in the image capturing area of the image capturing unit and a position of the set first area; and controlling a frame rate, which is used to record an image to be captured by the image capturing unit, based on a result of the determining.

According to still another aspect of the present invention, there is provided a non-transitory computer-readable storage medium having a program stored thereon, the program being executable to control an apparatus including an image capturing unit to perform functions comprising: detecting a position of a moving object in an image capturing area of the image capturing unit; obtaining information indicative of a moving speed of the moving object; setting a first area, which has a size based on the obtained information indicative of the moving speed of the moving object, in the image capturing area of the image capturing unit; determining a relationship between the detected position of the moving object in the image capturing area of the image capturing unit and a position of the set first area; and controlling a frame rate, which is used to record an image to be captured by the image capturing unit, based on a result of the determining.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 5 is a flowchart showing a series of processing items in the continuous capturing mode according to a second embodiment of the present invention.

DETAILED DESCRIPTION OF THE INVENTION (First Embodiment)

The first embodiment in which the present invention is applied to a digital camera will be described with reference to several views of the accompanying drawing.

Figure 1:
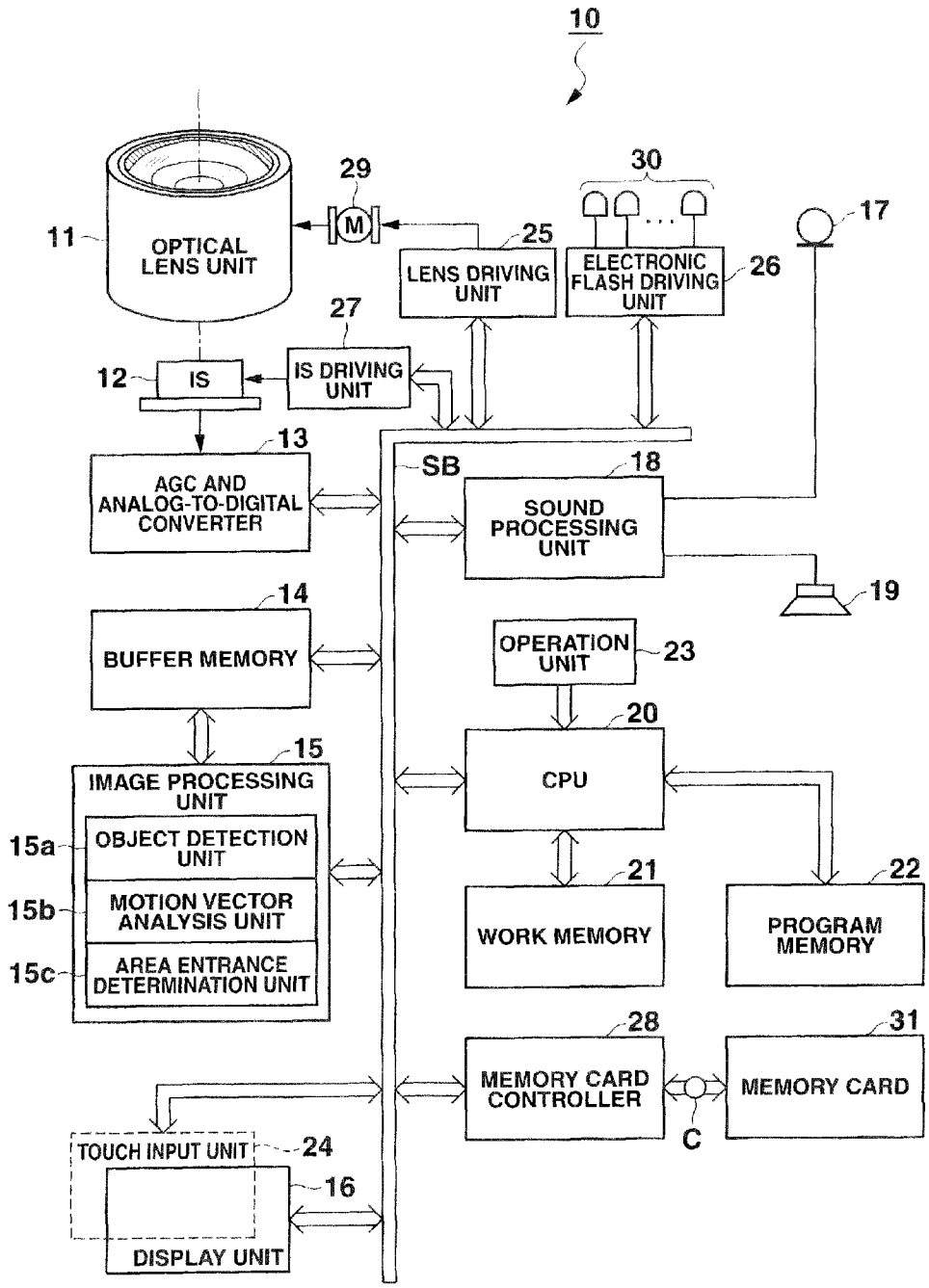
FIG. 1 is a block diagram showing the arrangement of the functional circuit of a digital camera according to first and second embodiments of the present invention.

FIG. 1 is a block diagram showing the circuit arrangement of a digital camera 10 according to the first embodiment. A CPU 20 controls an imaging lens unit 11 disposed on the front surface of a camera body to allow the optical image of an object to enter the image sensing surface of a solid-state image sensor (IS) 12 formed from a charge-coupled device (CCD), CMOS image sensor, or the like, thereby forming the image of the object.

In a monitor state also called live-view image display, the CPU 20 sends, to an AGC & analog-to-digital converter 13, an image signal obtained by image sensing on the solid-state image sensor 12. Then, the CPU 20 executes correlated square sampling, automatic gain adjustment, and analog-to-digital conversion processing for the image signal, and digitizes the image signal. A buffer memory 14 holds the image data of the digital value via a system bus SB.

An image processing unit 15 properly performs necessary image processing for the image data held in the buffer memory 14. The image processing unit 15 includes an object detection unit 15a, motion vector analysis unit 15b, and area entrance determination unit 15c.

The image processing unit 15 executes de-mosaic processing including matrix operation, pixel interpolation processing, and gamma correction processing for image data (to be referred to as "Bayer data") complying with the layout of a color filter with a Bayer array attached to the solid-state image sensor 12. The image processing unit 15 performs development for the Bayer data serving as raw data, and converts it into image data of the luminance-color difference system (YUV).

The image processing unit 15 generates, from this image data, image data whose numbers of pixels and tone bits are greatly decreased for display. The image processing unit 15 sends the generated image data to a display unit 16 to display it as a live-view image.

Similar to the optical lens unit 11, a microphone 17 is attached to the front surface of the camera body, and inputs sound from the object side. The microphone 17 converts the input sound into an electrical signal, and outputs the electrical signal to an audio processing unit 18.

In audio recording, still image capturing with audio, and moving image capturing, the audio processing unit 18 converts an audio signal input from the microphone 17 into digital data. The audio processing unit 18 detects the sound pressure level of the digital audio data. Further, the audio processing unit 18 compresses the audio data in a predetermined data file format such as Moving Picture Experts Group-4 Advanced Audio Coding (AAC), generating an audio data file and sending it to a recording medium (to be described later).

The audio processing unit 18 includes an audio source circuit such as a pulse code modulation (PCM) audio source. The audio processing unit 18 decompresses a compressed audio data file sent in audio playback, and converts the decompressed audio data into an analog signal. A loudspeaker 19 attached to the rear surface of the housing of the digital camera 10 is driven to amplify and output the audio of the analog signal.

The CPU 20 comprehensively controls these circuits. The CPU 20 is directly connected to a work memory 21 and program memory 22. The work memory 21 is formed from, for example, a DRAM. The program memory 22 is formed from, for example, an electrically programmable nonvolatile memory such as a flash memory. The program memory 22 permanently stores operation programs, data, and the like, including continuous capturing speed control (to be described later).

The CPU 20 executes the control operation of the overall digital camera 10 while reading necessary programs, data, and the like from the program memory 22, and temporarily expanding and storing them in the work memory 21, as needed.

The CPU 20 executes a control operation in correspondence with various key operation signals directly input from an operation unit 23, and an operation signal from a touch input unit 24 arranged at one end on the display unit 16.

The operation unit 23 includes, for example, a power key, shutter key, zoom-up/down key, capturing mode key, playback mode key, menu key, cursor ("↑", "→", "↓", and "←") keys, set key, cancel key, and display key.

The touch input unit 24 is integrally formed on the display unit 16 using a transparent conductive film. The touch input unit 24 sends, as an operation signal to the CPU 20, coordinate information of a position touched by the user's hand or finger.

The CPU 20 is connected via the system bus SB to a lens driving unit 25, an electronic flash driving unit 26, an image sensor (IS) driving unit 27, and a memory card controller 28 in addition to the AGC & analog-to-digital converter 13, the buffer memory 14, the image processing unit 15, the display unit 16, the touch input unit 24, and the audio processing unit 18.

Upon receiving a control signal from the CPU 20, the lens driving unit 25 controls rotation of a lens DC motor (M) 29, and changes the positions of some of a plurality of lens units which form the optical lens unit 11, for example, the positions of a zoom lens and focusing lens individually along the optical axis.

In still image capturing, upon receiving a control signal from the CPU 20, the electronic flash driving unit 26 drives to turn on, in synchronism with a capturing timing, an electronic flash 30 made up of a plurality of white high-intensity LEDs.

The image sensor driving unit 27 scans and drives the solid-state image sensor 12 in accordance with currently set capturing conditions and the like.

The image processing unit 15 performs de-mosaic processing for image data which has been sent from the AGC & analog-to-digital converter 13 upon image capturing in response to a shutter key operation on the touch input unit 24 and is held in the buffer memory 14. Further, the image processing unit 15 performs data compression processing in a predetermined data file format, such as discrete cosine transform (DCT) format or Huffman coding for Joint Photographic Experts Group (JPEG) format, thereby generating an image data file whose data amount is greatly reduced. The generated image data file is recorded on a memory card 31 via the system bus SB and memory card controller 28.

Also, the image processing unit 15 receives, via the system bus SB, image data which is read from the memory card 31 via the memory card controller 28 in the playback mode. The image processing unit 15 stores the image data in the buffer memory 14. Then, the image processing unit 15 obtains image data of an original size by decompression processing of decompressing compressed image data held in the buffer memory 14 by procedures reverse to those in recording. The image processing unit 15 outputs the obtained image data to the display unit 16 via the system bus SB to display it.

The memory card controller 28 is connected to the memory card 31 via a card connector C. The memory card 31 is a recording memory for image data and the like that is detachably mounted in the digital camera 10 and serves as a recording medium for the digital camera 10. The memory card 31 incorporates a flash memory serving as a nonvolatile memory electrically programmable for each block, and its driving circuit.

An operation in the embodiment will be described below.

Note that the following operation is executed after the CPU 20 reads an operation program and data stored in the program memory 22, expands them in the work memory 21, and stores them when capturing a plurality of still images temporally in the continuous capturing mode.

Operation programs and the like stored in the program memory 22 are those stored in the program memory 22 in shipment from the manufacturing factory of the digital camera 10. In addition, the operation programs and the like include new operation programs, data, and the like which are downloaded from the outside by connecting the digital camera 10 to a personal computer in, for example, upgrading of the digital camera 10.

Figure 2:
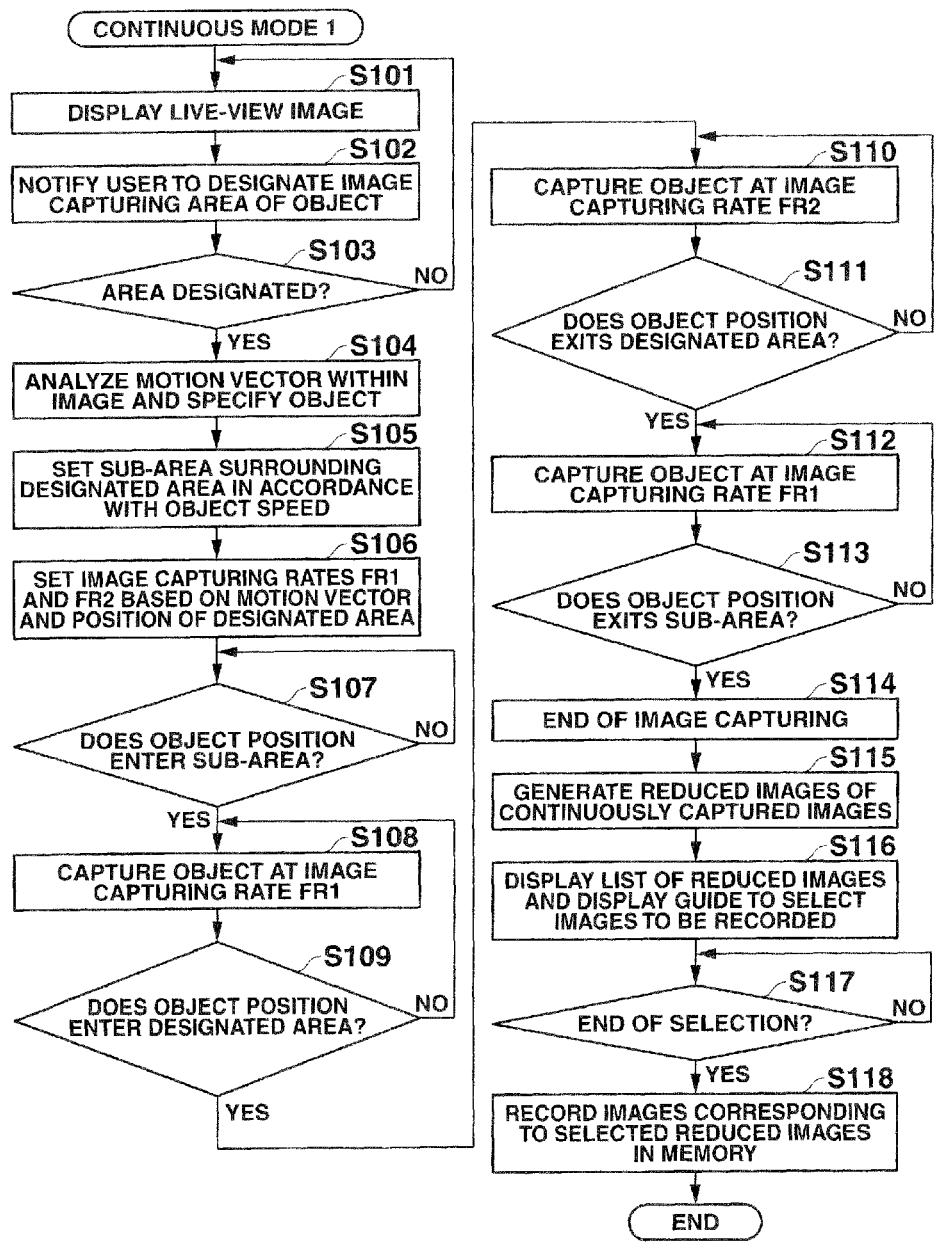
FIG. 2 is a flowchart showing a series of processing items in the continuous capturing mode according to the first embodiment.

FIG. 2 shows a series of processing items regarding capturing and subsequent recording in the continuous capturing mode. At the beginning of processing, the CPU 20 scans and drives the solid-state image sensor 12 via the IS driving unit 27 at a predetermined frame rate of, for example, 60 frames/second. While images obtained by the solid-state image sensor 12 are sequentially buffered in the buffer memory 14, the CPU 20 controls the display unit 16 to display these images as live-view images in real time (step S101). The CPU 20 controls the display unit 16 to display a character string such as "designate the range of an area to capture a main object" as a guide message at part of the display unit 16 such as the bottom of the screen to prompt the user of the digital camera 10 to designate the image capturing area of the object (step S102). In this way, the CPU 20 notifies the user to designate the image capturing area of the object. After the notification, the CPU 20 determines whether the user has actually designated the area (step S103). More specifically, the CPU 20 determines the designation of the image capturing position based on whether the user has performed a touch operation indicating a rectangular range in accordance with a coordinate signal output from the touch input unit 24 integrally formed with the display unit 16.

If the user has not designated the area, the CPU 20 returns the process to step S101 to repetitively execute the same process.

If the user has designated the area by a touch operation on the touch input unit 24, the CPU 20 determines it in step S103. Then, the CPU 20 specifies the area of the main object by controlling the object detection unit 15a and motion vector analysis unit 15b of the image processing unit 15 to analyze a motion vector in time series images buffered in the buffer memory 14 (step S104).

More specifically, the CPU 20 controls the object detection unit 15a and motion vector analysis unit 15b to analyze motion vectors in a plurality of block areas within an image, and specifies a block area having a specific motion vector as the area of the main object.

Details of motion vector analysis processing executed by the motion vector analysis unit 15b is a well-known technique generally executed in a moving picture compression encoding technique such as Moving Picture Experts Group (MPEG), and a description thereof will be omitted.

After the main object is specified by its motion vector, the CPU 20 sets a sub-area surrounding the designated area on the display unit 16 in accordance with the magnitude of specified motion vector, that is to say, the moving speed of the main object within the image (step S105).

Figure 3A:
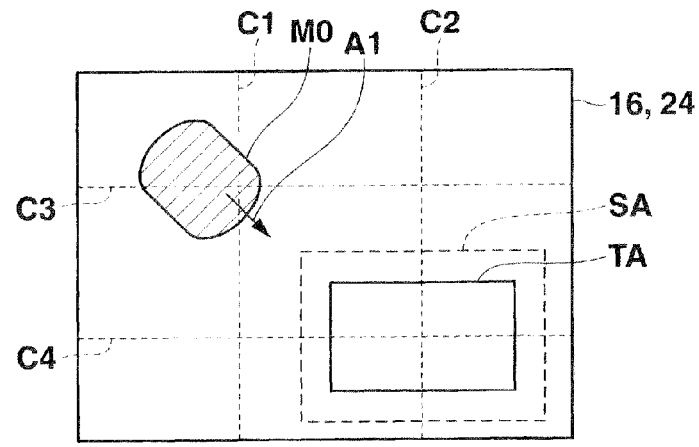
FIGS. 3A, 3B and 3C are view each showing a main object which moves on the monitor screen in continuous capturing according to the first embodiment.

FIG. 3A shows the relationship between a main object MO, a designated area TA, and a sub-area SA which are extracted from a screen displayed on the display unit 16. The CPU 20 sets the sub-area SA on the display unit 16 to be larger than the designated area TA when the magnitude of motion vector is larger than a predetermined value, and smaller than the designated area TA when the magnitude of motion vector is smaller than a predetermined value. The motion vector and the size of the sub-area SA with respect to the designated area TA may be set stepwise using a plurality of thresholds set in advance.

Note that the main object MO in the screen of the display unit 16 is an object moving in a direction indicated by an arrow A1. The moving direction of the main object MO is not limited to one obtained when the digital camera 10 is fixed by a tripod or the like and captures an image, and a real moving object serving as the main object MO moves within the screen. That is, the movement of the main object MO includes even relative movement within the screen when the user holds the digital camera 10 in his or her hands and captures an image, and the composition is changed so that the main object MO moves to a position the user wants within the capturing range.

In FIG. 3A, lines C1 to C4 indicated by two vertical lines and two horizontal lines, that is to say, a total of four broken lines are set to assist capturing in a composition at the golden ratio. For example, whether to display C1 to C4 on the display unit 16 can be switched by a display key operation on the operation unit 23.

After that, the CPU 20 sets two types of image capturing rates FR1 and FR2 (FR1<FR2) in continuous capturing based on the set motion vector and the position of the designated area (step S106).

Image capturing rate FR1 is an image capturing frame rate used in continuous capturing when a partial area of the main object MO enters the sub-area SA. Image capturing rate FR2 is an image capturing frame rate used in continuous capturing when the entire area of the main object MO enters the designated area TA.

Upon completion of various settings, the CPU 20 suspends continuous capturing processing until it is determined using the area entrance determination unit 15c of the image processing unit 15 that a partial area of the main object MO in the image has reached the sub-area SA, in order to start actual continuous capturing (step S107).

In step S107, the area entrance determination unit 15c determines that a partial area of the main object MO in the image has reached the sub-area SA. The CPU 20 starts continuous capturing at image capturing rate FR1 of, for example, 15 frames/second set in step S106 (step S108). The CPU 20 sequentially stores the raw data acquired by capturing in the buffer memory 14.

Then, the area entrance determination unit 15c determines whether the entire area of the main object MO in the image has entered the designated area TA (step S109). If the area entrance determination unit 15c determines that the entire area of the main object MO in the image has not entered the designated area TA, the CPU 20 returns the process to step S108.

While controlling the image sensor driving unit 27 to maintain continuous capturing at image capturing rate FR1, the CPU 20 repetitively executes the processes of steps S108 and S109 until the area entrance determination unit 15c determines that the entire area of the main object MO in the image has entered the designated area TA.

Figure 3B:
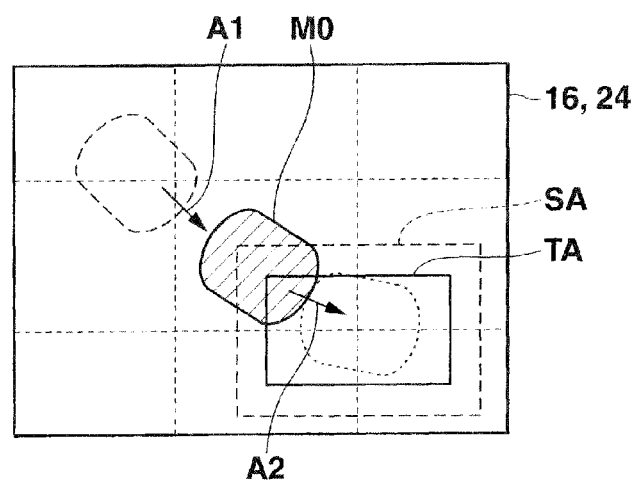

FIG. 3B shows a state in which the main object MO further moves down to the right within the screen from the state of FIG. 3A and crosses the sub-area SA, and its partial area has reached the designated area TA. As shown in FIG. 3B, the main object MO further moves within the screen in a direction indicated by an arrow A2, and enters the designated area TA, obtaining a capturing composition the user intends.

Figure 3C:
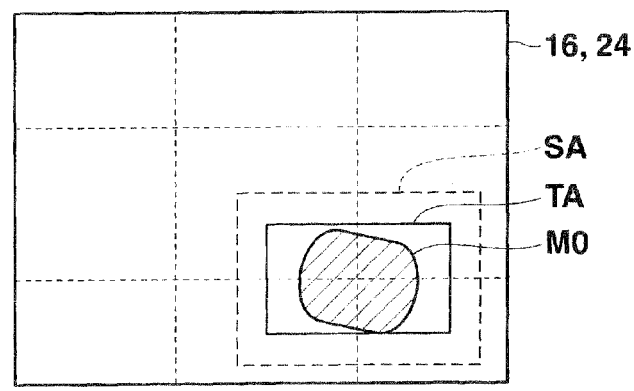

After the main object MO further moves within the screen of the display unit 16 and completely enters the designated area TA, as shown in FIG. 3C, the CPU 20 determines it in step S109, and controls the image sensor driving unit 27 to maintain continuous capturing at image capturing rate FR2 of, for example, 30 frames/second set in step S106 instead of image capturing rate FR1 (step S110).

The area entrance determination unit 15*c* determines whether a partial area of the main object MO in the image has exited the designated area TA (step S111). If the area entrance determination unit 15*c* determines that a partial area of the main object MO in the image has not exited the designated area TA, the CPU 20 returns the process to step S110.

By repetitively executing the processes of steps S110 and S111, the CPU 20 controls the image sensor driving unit 27 to maintain continuous capturing at image capturing rate FR2 while the entire area of the main object MO in the image entered the designated area TA.

If a partial area of the main object MO in the image has exited the designated area TA, the CPU 20 determines it in step S111, and controls the image sensor driving unit 27 to again maintain continuous capturing at image capturing rate FR1 set in step S106 (step S112).

The area entrance determination unit 15*c* determines whether the entire area of the main object MO in the image has exited the sub-area SA (step S113). If the area entrance determination unit 15*c* determines that the entire area of the main object MO in the image has not exited the sub-area SA, the CPU 20 returns the process to step S112.

By repetitively executing the processes of steps S112 and S113, the CPU 20 controls the image sensor driving unit 27 to maintain continuous capturing at image capturing rate FR1 until the entire area of the main object MO in the image exited the sub-area SA.

After the entire area of the main object MO in the image exits the sub-area SA, the CPU 20 determines it in step S113 and controls the image sensor driving unit 27 to stop continuous capturing (step S114).

Figure 4:
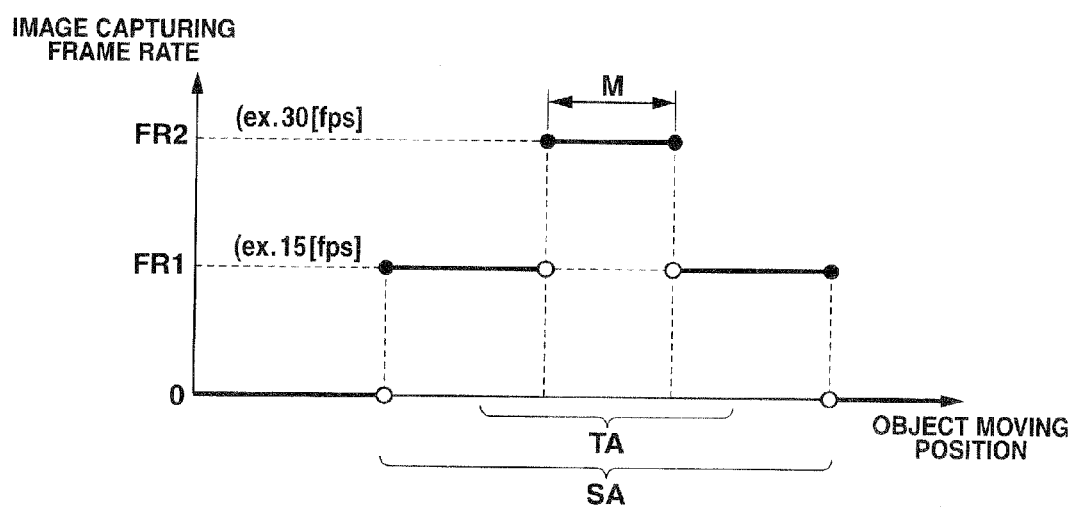
FIG. 4 is a view showing a change of the continuous capturing speed according to the first embodiment.

FIG. 4 shows the relationship between the image capturing frame rate and the positions of the sub-area SA and designated area TA with respect to the moving position of the main object MO.

As shown in FIG. 4, when a partial area of the main object MO enters the sub-area SA, continuous capturing starts at frame rate FR1. In a period M during which the entire area of the main object MO enters the designated area TA, the composition is highly likely to be one the user intends. Thus, frame rate FR1 is changed to higher frame rate FR2, and continuous capturing is maintained.

Even after a partial area of the main object MO exits the designated area TA, continuous capturing is maintained at frame rate FR1 until the entire area of the main object MO exits the sub-area SA. When the entire area of the main object MO exits the sub-area SA, continuous capturing stops.

After the stopping of continuous capturing, the CPU 20 controls the image processing unit 15 to generate reduced images by greatly decreasing the number of pixels in each of image data which are obtained by a series of continuous capturing operations and held in the buffer memory 14 (step S115).

The CPU 20 controls the display unit 16 to display a list of generated reduced images, and display a guide message such as "touch the 'save' button after touching all images to be saved" to prompt the user to select images to be saved. In synchronism with this display, the CPU 20 controls the display unit 16 to display a "save" button at, for example, the lower right end of the display unit 16 to designate the end of selection and execution of save (step S116).

At this time, the CPU 20 controls the display unit 16 to also display an empty check box at, for example, the upper left portion of each reduced image. For a touched reduced image, the CPU 20 controls the display unit 16 to display a check "✓" in the check box. The user can easily discriminate an image to be saved from one not to be saved.

Alternatively, for a reduced image touched to be saved, the entire reduced image may be displayed semi-transparently, and a legend such as "RECORD" may be displayed in red to overlap the image.

Then, the CPU 20 waits until the user touches the "save" button and ends selection of reduced images (step S117). If selection of reduced images is designated, the CPU 20 determines it in step S117. The CPU 20 converts image data which corresponds to each selected reduced image and is held in the buffer memory 14, into an image data file in a predetermined data file format such as JPEG. The CPU 20 records the obtained image data file on the memory card 31 (step S118), ending a series of processes in the continuous capturing mode.

In the operation example of FIG. 2, images to be saved are individually selected from reduced images. Alternatively, the user may select two, start and end images indicating the range of time series successive images considered to match a composition the user wants, out of a displayed list of reduced images. In this case, a plurality of images within the continuous range defined by the two, start and end images are selected at once.

In any case, the user can select an image to be recorded from successive images to be recorded.

As described above in detail, according to the first embodiment, a plurality of images of a moving object can be captured easily in a composition the user wants.

In addition, in the first embodiment, when the main object MO enters the designated area TA, the current frame rate automatically switches to a higher frame rate and continuous capturing is maintained. A larger number of images of the main object MO in a composition the user wants can be acquired. As a result, the user can capture satisfactory images with a high success rate.

In the first embodiment, when setting frame rates for continuous capturing, the motion vector of the main object MO in the screen is calculated, and frame rate FR2 used when the main object MO exists in the designated area TA and frame rate FR1 before and after this state are set in accordance with the magnitude of motion vector.

By using a motion vector calculation algorithm popular in moving image processing, appropriate frame rates can be set in accordance with the moving speed of the main object MO serving as a moving object within the screen.

In the above description of the embodiment, the user sets the arbitrary designated area TA. However, it is also possible to prepare a plurality of designated area patterns in advance and select an arbitrary one of them by the user.

Preparing patterns of the designated area TA in advance can reduce the load on the user in capturing in a general composition. capturing can more easily and quickly shift to continuous capturing.

Although not described in the embodiment, the frame rate of continuous capturing may be set aiming at a composition in which a main object and a characteristic object in the background coexist. For example, characteristic objects whose patterns can be extracted from images, such as various structural landmarks including a tower and a building, and animals such as a pet are considered to belong to the background area. When a main object overlaps a characteristic object, the frame rate of continuous capturing is intentionally decreased. This enables reliably capturing an image in a more expressive composition without missing a good shot.

When extracting the pattern of the characteristic object from the image, the user may directly designate the characteristic object on the touch input unit 24 integrally formed with the display unit 16, as described in the embodiment. This can further reduce the load of image processing calculation for pattern extraction.

(Second Embodiment)

The second embodiment in which the present invention is applied to a digital camera will be described with reference to several views of the accompanying drawing.

The circuit arrangement of a digital camera 10 according to the second embodiment is basically the same as that shown in FIG. 1. The same reference numerals denote the same parts, and an illustration and description thereof will not be repeated.

In the second embodiment, an area entrance determination unit 15c of an image processing unit 15 determines how much the main object has entered a specified image capturing position, based on whether the distance between the position of the main object and an image capturing position specified by the user that is calculated by processes of an object detection unit 15a and motion vector analysis unit 15b becomes less than or equal to first and second set distances r1 and r2.

An operation in the second embodiment will be explained.

Note that the following operation is executed after a CPU 20 reads an operation program and data stored in a program memory 22, expands them in a work memory 21, and stores them when capturing a plurality of still images temporally continuous in the continuous capturing mode.

Operation programs and the like stored in the program memory 22 are those stored in the program memory 22 in shipment from the manufacturing factory of the digital camera 10. In addition, the operation programs and the like include new operation programs, data, and the like which are downloaded from the outside by connecting the digital camera 10 to a personal computer in, for example, upgrading of the digital camera 10.

FIG. 5 shows a series of processing items regarding capturing and subsequent recording in the continuous capturing mode. At the beginning of processing, the CPU 20 scans and drives a solid-state image sensor 12 via an image sensor driving unit 27 at a predetermined frame rate of, for example, 60 frames/second. While obtained images are sequentially buffered in a buffer memory 14, the CPU 20 controls a display unit 16 to display these images as live-view images in real time (step S201). The CPU 20 controls the display unit 16 to display a character string such as "designate a position to capture a main object" as a guide message at part of the display unit 16 such as the bottom of the screen to prompt the user of the digital camera 10 to designate the image capturing position of the object (step S202). In this manner, the CPU 20 notifies the user to designate the image capturing area of the object.

After the notification, the CPU 20 determines whether the user has actually designated the image capturing position (step S203). More specifically, the CPU 20 determines the designation of the image capturing position based on whether the user has performed a touch operation to designate an arbitrary position in accordance with a coordinate signal output from a touch input unit 24 integrally formed with the display unit 16.

If the user has not designated the position, the CPU 20 returns the process to step S201 to repetitively execute the same process.

If the user has designated the position by a touch operation on the touch input unit 24, the CPU 20 determines it in step S203. Then, the CPU 20 controls the object detection unit 15a and motion vector analysis unit 15b of the image processing unit 15 to analyze a motion vector in time series images buffered in the buffer memory 14 for each predetermined block area (not shown). The CPU 20 specifies, as the position of the main object, the position of a block area analyzed to have a specific motion vector (step S204).

When there are a plurality of block areas having a specific motion vector, for example, the center of a block which has the specific motion vector and exists at the shortest distance from a position designated by the touch operation can be employed as the position of the main object. As the object position, the average of the center positions of a plurality of block areas having a specific motion vector may be adopted.

In the second embodiment, the CPU 20 uses, for example, 16 pixels in the vertical direction×16 pixels in the horizontal direction as a basic block, divides an image into a plurality of block areas, and controls the motion vector analysis unit 15b to analyze a motion vector in each divided block area. From the analysis result, the CPU 20 specifies, as the area of the main object, a block area having a specific motion vector in comparison with the remaining block areas.

Details of motion vector analysis processing executed by the motion vector analysis unit 15b is a well-known technique generally executed in a moving picture compression encoding technique such as Moving Picture Experts Group (MPEG), and a description thereof will be omitted.

After a block area containing the main object is specified, the CPU 20 sets two types of image capturing rates FR1 and FR2 (FR1<FR2) in continuous capturing in accordance with the distance between a pixel position closest to the image capturing position designated by the user within the block area and the image capturing position designated by the user (step S205).

Image capturing rate FR1 is an image capturing frame rate used in continuous capturing when the distance between the position of a partial area of a main object MO and the designated image capturing position is within the first distance r1. Image capturing rate FR2 is an image capturing frame rate used in continuous capturing when the distance between the position of a partial area of the main object MO and the designated image capturing position is within the second distance r2 shorter than the first distance r1 (r1>r2).

Upon completion of various settings, the CPU 20 suspends continuous capturing control until the area entrance determination unit 15c of the image processing unit 15 determines that the position of a partial area of the main object MO in the image exists within the first distance r1 (step S206).

Figure 6A:
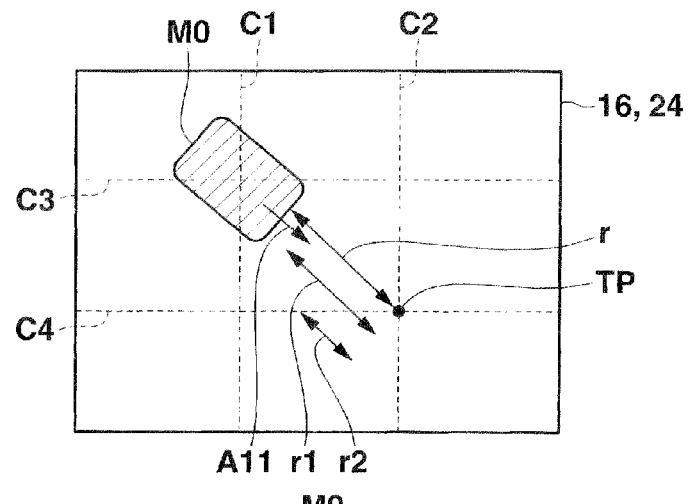
FIGS. 6A, 6B and 6C are views each showing a main object which moves on the monitor screen in continuous capturing according to the second embodiment.

FIG. 6A shows the relationship between the position of the main object MO and a designated position TP in the screen displayed on the display unit 16. In this state, a distance r from the front end position of the main object MO to the image capturing position TP has not reached either the first distance r1 or second distance r2. Thus, the CPU 20 does not start continuous capturing control.

Note that the main object MO in the screen of the display unit 16 is an object moving in a direction indicated by an arrow A11. The moving direction of the main object MO is not limited to one obtained when the digital camera 10 is fixed by a tripod or the like and captures an image, and a real moving object serving as the main object MO moves within the screen. The movement of the main object MO includes even relative movement within the screen when the user holds the digital camera 10 in his hands and captures an image, and the composition is changed so that the main object MO moves to a position the user wants within the capturing range.

In FIG. 6A, lines C1 to C4 indicated by two vertical lines and two horizontal lines, that is to say, a total of four broken lines are set to assist capturing in a composition at the golden ratio. For example, whether to display C1 to C4 on the display unit 16 can be switched by a display key operation on the operation unit 23.

If the area entrance determination unit 15c determines that distance r from the position of a partial area of the main object MO in the image to the image capturing position TP becomes less than or equal to the first distance r1, the CPU 20 determines it in step S206, and starts continuous capturing control at image capturing rate FR1 of, for example, 15 frames/second set in step S205 (step S207). The CPU 20 sequentially stores the raw data acquired by capturing in the buffer memory 14.

Then, the area entrance determination unit 15c determines whether distance r from the position of a partial area of the main object MO in the image to the image capturing position TP becomes less than or equal to the second distance r2 (step S208). If the area entrance determination unit 15c determines that distance r has not become less than or equal to the second distance r2, the CPU 20 returns the process to step S207.

By repetitively executing the processes of steps S207 and S208, the CPU 20 waits until the area entrance determination unit 15c determines that distance r from the position of a partial area of the main object MO to the image capturing position TP becomes less than or equal to the second distance r2, while continuing continuous capturing control at image capturing rate FR1.

Figure 6B:
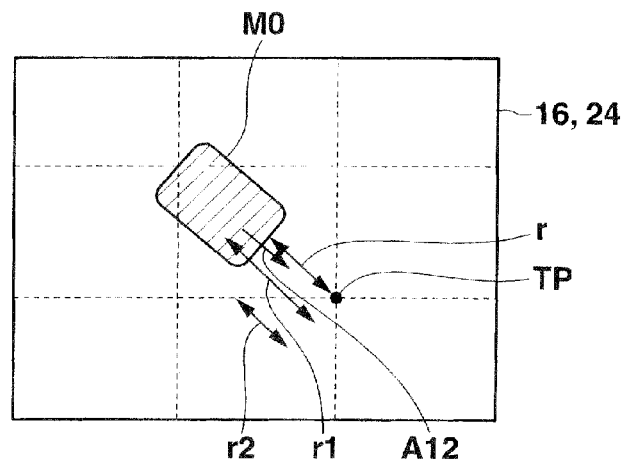

FIG. 6B shows a state in which the main object MO further moves down to the right within the screen from the state of FIG. 6A, and distance r from the position of a partial area of the main object MO to the image capturing position TP has become less than or equal to the first distance r1 but has not become less than or equal to the second distance r2. As shown in FIG. 6B, since the main object MO further moves in a direction indicated by an arrow A12 within the screen, distance r from the position of the main object MO to the image capturing position TP becomes less than or equal to the second distance r2, and the composition comes close to one the user intends.

Figure 6C:
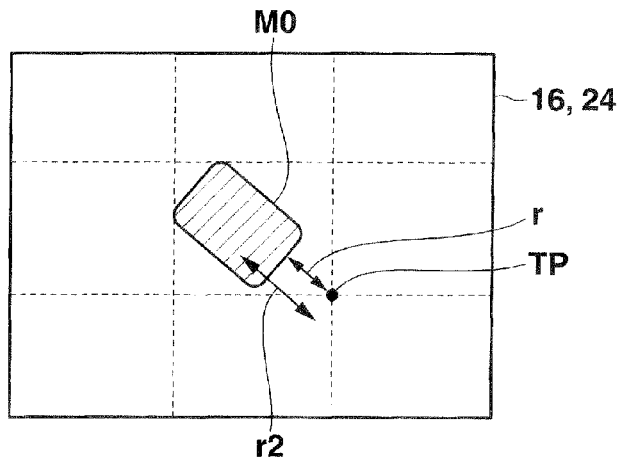

When the main object MO further moves within the screen of the display unit 16 and distance r up to the image capturing position TP becomes less than or equal to the second distance r2, as shown in FIG. 6C, the CPU 20 determines it in step S208, and maintains continuous capturing processing at image capturing rate FR2 of, for example, 30 frames/second set in step S205 instead (step S209).

The area entrance determination unit 15c determines whether the distance between the position of the main object MO in the image and the image capturing position TP becomes longer than the second distance r2 (step S210). If the area entrance determination unit 15c determines that the distance from the position of a partial area of the main object MO to the image capturing position TP is less than or equal to the second distance r2, the CPU 20 returns the process to step S209.

By repetitively executing the processes of steps S209 and S210, the CPU 20 maintains continuous capturing control at image capturing rate FR2 while the position of a partial area of the main object MO in the image exists within the second distance r2 from the image capturing position TP.

If the entire area of the main object MO in the image moves apart from the image capturing position TP by more than the second distance r2, the CPU 20 determines it in step S210, and again maintains continuous capturing at image capturing rate FR1 set in step S205 (step S211).

After that, the area entrance determination unit 15c determines whether the distance between the entire main object MO in the image and the image capturing position TP becomes longer than the first distance r1 (step S212). If the area entrance determination unit 15c determines that the position of a partial area of the main object MO exists within the first distance r1 and does not move apart, the CPU 20 returns the process to step S211.

By repetitively executing the processes of steps S211 and S212, the CPU 20 maintains continuous capturing at image capturing rate FR1 until the position of a partial area of the main object MO in the image exists within the first distance r1 from the image capturing position TP.

If the area entrance determination unit 15c determines that the entire area of the main object MO in the image moves apart from the image capturing position TP by more than the first distance r1, the CPU 20 determines it in step S212, and stops continuous capturing control (step S213).

After the stopping of continuous capturing, the CPU 20 generates reduced images by greatly decreasing the number of pixels in each of image data which are obtained by a series of continuous capturing operations and held in the buffer memory 14 (step S214).

The CPU 20 controls the display unit 16 to display a list of generated reduced images, and display a guide message such as "touch the 'save' button after touching all images to be saved" to prompt the user to select images to be saved. In synchronism with this display, the CPU 20 controls the display unit 16 to display a "save" button at, for example, the lower right end of the display unit 16 to designate the end of selection and execution of save (step S215).

At this time, the CPU 20 controls the display unit 16 to also display an empty check box at, for example, the upper left portion of each reduced image. For a reduced image touched by the user, the CPU 20 controls the display unit 16 to display a check "✓" in the check box. The user can easily discriminate an image to be saved from one not to be saved.

Alternatively, for a reduced image touched by the user to be saved, the entire reduced image may be grayed out, and a legend such as "RECORD" may be displayed in red to overlap the image.

Then, the CPU 20 waits until the user touches the "save" button and ends selection of reduced images (step S216). If selection of reduced images is designated, the CPU 20 determines it in step 5216. The CPU 20 converts image data which corresponds to each selected reduce image and is held in the buffer memory 14, into an image data file in a predetermined data file format such as JPEG. The CPU 20 records the image data file on the memory card 31 (step S217), ending a series of processes in the continuous capturing mode.

In the operation example of FIG. 5, images to be saved are individually selected from reduced images. Alternatively, the user may select two, start and end images indicating the range of time series successive images considered to match a composition the user wants, out of reduced images displayed in a list. In this case, a plurality of images within the continuous range defined by the two, start and end images are selected at once.

As described above in detail, according to the second embodiment, a plurality of images of a moving object can be captured easily in a composition the user wants.

In the second embodiment, the start and end of capturing and the image capturing frame rate in continuous capturing are variously set based on the distance between the closest position of the main object MO and the image capturing position TP designated by the user. Control by the CPU 20 using the image processing unit 15 can be further simplified.

Note that the first and second embodiments have described a method of controlling the image capturing frame rate at two stages, but the present invention is not limited to this. For example, in the above embodiments, finer image capturing frame rates may be set and changed at multiple stages in accordance with, for example, the distance between the position of the main object MO and the designated area TA or designated position TP.

In the above embodiments, the present invention is applied to a digital camera which performs continuous capturing. However, the present invention is not limited to this, and is similarly applicable to various devices such as a cellular phone, personal digital assistant (PDA), electronic book reader, portable game console, and portable computer as long as an electronic device has a camera function.

Further, the present invention is not limited to the above-described embodiments and can be various modified without departing from the scope of the invention in practical use. Functions executed in the above-described embodiments may be combined as properly as possible. The embodiments include various stages, and various inventions can be extracted by an appropriate combination of components disclosed. For example, when effects are obtained even if several components are omitted from all those described in the embodiments, an arrangement from which these components are omitted can be extracted as an invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image capturing apparatus comprising:
   an image capturing unit;
   a detection unit configured to detect a position of a moving object in an image capturing area of the image capturing unit;
   a speed obtaining unit configured to obtain information indicative of a moving speed of the moving object;
   a first setting unit configured to set an area, which has a size based on the information indicative of the moving speed of the moving object obtained by the speed obtaining unit, in the image capturing area of the image capturing unit;
   a determination unit configured to determine a relationship between the position of the moving object detected by the detection unit in the image capturing area of the image capturing unit and a position of the area set by the first setting unit; and
   a control unit configured to control a frame rate, which is used to record an image to be captured by the image capturing unit, based on a result of the determination by the determination unit.

2. The image capturing apparatus according to claim 1, further comprising a speed calculation unit configured to calculate the moving speed of the moving object,
   wherein the speed obtaining unit is configured to obtain the information indicative of the moving speed of the moving object calculated by the speed calculation unit.

3. The image capturing apparatus according to claim 1, further comprising a second setting unit configured to set a specific position where the moving object is to be recorded in the image capturing area of the image capturing unit,
   wherein:
   the first setting unit is configured to set (i) a first area which corresponds to the specific position set by the second setting unit and (ii) a second area which has a size based on the information indicative of the moving speed of the moving object obtained by the speed obtaining unit, in the image capturing area of the image capturing unit;
   the determination unit is configured to determine whether the position of the moving object is in the first area or the second area; and
   the control unit is configured to control the frame rate differently in accordance with one of (i) a case in which the determination unit determines that the position of the moving object is in the first area, and (ii) a case in which the determination unit determines that the position of the moving object is in the second area.

4. The image capturing apparatus according to claim 3, wherein the first setting unit is configured to set the second area such that the second area overlaps with the first area.

5. The image capturing apparatus according to claim 3, wherein the control unit is configured to perform control such that a frame rate to be controlled in the case in which the determination unit determines that the position of the moving object is in the first area is higher than a frame rate to be controlled in the case in which the determination unit determines that the position of the moving object is in the second area.

6. The image capturing apparatus according to claim 3, wherein the control unit is configured to variably control the frame rate, which is used to record the image to be captured by the image capturing unit, based on the size of the second area, in the case in which the determination unit determines that the position of the moving object is in the second area.

7. The image capturing apparatus according to claim 3, wherein the control unit is configured to control the frame rate, which is used to record the image to be captured by the image capturing unit, based on the information indicative of the moving speed of the moving object obtained by the speed obtaining unit, in the case in which the determination unit determines that the position of the moving object is in the second area, and in the case in which the determination unit determines that the position of the moving object is in the first area.

8. The image capturing apparatus according to claim 3, further comprising a distance obtaining unit configured to obtain a distance between the position of the moving object and the specific position,
   wherein the determination unit is further configured to determine a relationship between the position of the moving object and the specific position based on the distance obtained by the distance obtaining unit.

9. The image capturing apparatus according to claim 1, further comprising a vector obtaining unit configured to obtain a motion vector of the moving object in each of images sequentially captured by the capturing unit, wherein the detection unit is configured to detect the position of the moving object based on the motion vector obtained by the vector obtaining unit.

10. The image capturing apparatus according to claim 3, wherein the second setting unit is configured to set the specific position from among predetermined candidates for positions.

11. The image capturing apparatus according to claim 3, wherein:

the second setting unit is configured to divide the image capturing area of the image capturing unit to set a background area in which a pattern of a characteristic object can be extracted, and a moving-object area in which the moving object is to be captured, and the control unit is configured to control the frame rate, which is used to record the image to be captured by the image capturing unit, based on whether the position of the moving object is in the moving-object area.

12. The image capturing apparatus according to claim 1, further comprising:

a holding unit configured to hold images sequentially captured at a frame rate controlled by the control unit;

a display control unit configured to display a list of images held by the holding unit on a display unit;

a selection unit configured to receive a selection of an image from the list of images displayed on the display unit; and a recording unit configured to record a specific image selected by the selection unit in a recording unit.

13. A frame rate control apparatus comprising:

a detection unit configured to detect a position of a moving object in an image capturing area of an image capturing unit;

a speed obtaining unit configured to obtain information indicative of a moving speed of the moving object;

a first setting unit configured to set an area, which has a size based on the information indicative of the moving speed of the moving object obtained by the speed obtaining unit, in the image capturing area of the image capturing unit;

a determination unit configured to determine a relationship between the position of the moving object detected by the detection unit in the image capturing area of the image capturing unit and a position of the area set by the first setting unit; and a control unit configured to control a frame rate, which is used to record an image to be captured by the image capturing unit, based on a determination result of the determination unit.

14. An image capturing control method for use in an apparatus including an image capturing unit, the method comprising:

detecting a position of a moving object in an image capturing area of the image capturing unit;

obtaining information indicative of a moving speed of the moving object;

setting a first area, which has a size based on the obtained information indicative of the moving speed of the moving object, in the image capturing area of the image capturing unit;

determining a relationship between the detected position of the moving object in the image capturing area of the image capturing unit and a position of the set first area; and controlling a frame rate, which is used to record an image to be captured by the image capturing unit, based on a result of the determining.

15. A non-transitory computer-readable storage medium having a program stored thereon, the program being executable to control an apparatus including an image capturing unit to perform functions comprising:

detecting a position of a moving object in an image capturing area of the image capturing unit;

obtaining information indicative of a moving speed of the moving object;

setting a first area, which has a size based on the obtained information indicative of the moving speed of the moving object, in the image capturing area of the image capturing unit;

determining a relationship between the detected position of the moving object in the image capturing area of the image capturing unit and a position of the set first area; and controlling a frame rate, which is used to record an image to be captured by the image capturing unit, based on a result of the determining.

* * * * *